(12) United States Patent
Luo et al.

(10) Patent No.: US 7,738,083 B2
(45) Date of Patent: Jun. 15, 2010

(54) DISTANT MEASUREMENT METHOD AND DISTANT MEASUREMENT SYSTEM

(75) Inventors: Yin-Long Luo, Hang-Zhou (CN); Song Li, Hang-Zhou (CN); Jun Wang, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 365 days.

(21) Appl. No.: 12/025,817

(22) Filed: Feb. 5, 2008

(65) Prior Publication Data

US 2009/0195769 A1  Aug. 6, 2009

(51) Int. Cl.
*G01C 3/08* (2006.01)
(52) U.S. Cl. ..................... 356/5.15; 356/5.1
(58) Field of Classification Search ........... 356/4.01, 356/5.01–5.15
See application file for complete search history.

(56) References Cited

U.S. PATENT DOCUMENTS

| | | | | |
|---|---|---|---|---|
| 5,082,364 A * | 1/1992 | Russell | ................ | 356/5.15 |
| 5,949,531 A * | 9/1999 | Ehbets et al. | ................ | 356/5.01 |
| 6,369,880 B1 * | 4/2002 | Steinlechner | ................ | 356/5.11 |
| 6,633,367 B2 * | 10/2003 | Gogolla | ................ | 356/5.15 |
| 2008/0239281 A1 * | 10/2008 | Bridges | ................ | 356/5.09 |

* cited by examiner

*Primary Examiner*—Isam Alsomiri
(74) *Attorney, Agent, or Firm*—Thomas, Kayden, Horstemeyer & Risley

(57) ABSTRACT

A distant measurement method and a distant measurement system are provided. The distant measurement method includes the following steps: emitting a first light beam and a second light beam from an emitting terminal, wherein the first light beam travels toward a target; providing a switching sequence by a switch mechanism; placing a receiving terminal to receive the first light beam reflected from the target in accordance with the switching sequence and correspondingly provide a first electrical signal, and to receive the second light beam and correspondingly provide a second electrical signal; and utilizing a controlling terminal to receive the first and second electrical signals, and calculate distance between the distant measurement system and the target in accordance with a phase differential formed between the first and second electrical signals.

16 Claims, 4 Drawing Sheets

DISTANT MEASUREMENT METHOD AND DISTANT MEASUREMENT SYSTEM

BACKGROUND OF THE INVENTION

1. Field of the Invention

The invention relates to a distant measurement method, and more particularly to a distant measurement method utilizing phase shift variation of light beams to estimate distance and a distant measurement system applied therewith.

2. Description of the Related Art

With the development of electronic techniques and semiconductor laser elements, palm-sized distant measurement devices have been extensively used in the architecture, traffic, graphical reconnaissance and interior decoration fields.

In general, a conventional distant measurement device comprises an emitting module with a built-in light emitting element to emit a light beam and a receiving module with a light receiving element to receive the light beam reflected from a target.

Specifically, the light emitting element and the light receiving element used in a conventional phase-type distant measurement device are made of semiconductor material. Based on the characteristics of the semiconductor material to excitedly emit a light beam to the target by the light emitting element, the light receiving element receives and converts the light beam reflected or scattered from the target and converts to an electrical signal. A phase shifting is obtained by comparing the emitted light beam and the reflected light beam, thus, a distance between the distant measurement system and the target can be estimated.

However, due to the light emitting element respectively emitting a measurement beam and a reference light beam during the measurement process of the conventional phase-type distant measurement device, temperature of the light emitting element is increased as the number of times of the measuring process is increased, thus, changeable noise occurs. Further, if the distance between the target and the distant measurement device is fairly short, the time interval between the measurement light beam and the reference light beam received by the light receiving element may be short, thus negatively influencing precision of distant measurement by forming a mutual interference between the measurement light beam and the reference light beam and causing an unpredictable error in the electrical signal output from the light receiving element.

BRIEF SUMMARY OF THE INVENTION

Based on the described problems, the invention provides a distant measurement method and a distant measurement system.

The distant measurement method of the invention is applied by a distant measurement system, comprising: emitting a first light beam and a second light beam from an emitting terminal, wherein the first light beam travels toward a target; providing a switching sequence by a switch mechanism; placing a receiving terminal to receive the first light beam reflected from the target in accordance with the switching sequence and correspondingly provide a first electrical signal, and to receive the second light beam and correspondingly provide a second electrical signal; and utilizing a controlling terminal to receive the first and second electrical signals, and calculating distance between the distant measurement system and the target in accordance with a phase differential formed between the first and second electrical signals.

The distant measurement system of the invention comprises an emitting module, a receiving module, a switching unit and a controlling module. The emitting module emits a first light beam and a second light beam, respectively, wherein the first light beam travels toward a target. The receiving module receives the first light beam reflected from the target to correspondingly convert the reflected first light beam to a first electrical signal and receives the second light beam to correspondingly convert the reflected second light beam to a second electrical signal. The switching unit controls the receiving module to receive the first and second light beams in accordance with the switching sequence. The controlling module receives the first and the second electrical signals outputted from the receiving module and calculating a distance between the distant measurement system and the target in accordance with a phase differential formed between the first and second electrical signals.

The invention determines the switching sequence by the switching mechanism, thus, operating the emitting module of the emitting terminal and the receiving module of the receiving terminal in accordance with a switching sequence. Thus, interferences between the light beam signals generated by the receiving module of the receiving terminal can be prevented, even if the time interval between the first and second light beam is very short.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The embodiment provides a distant measurement method applied by a distant measurement system, thereby assuring precision of the distant measurement system.

Figure 1:
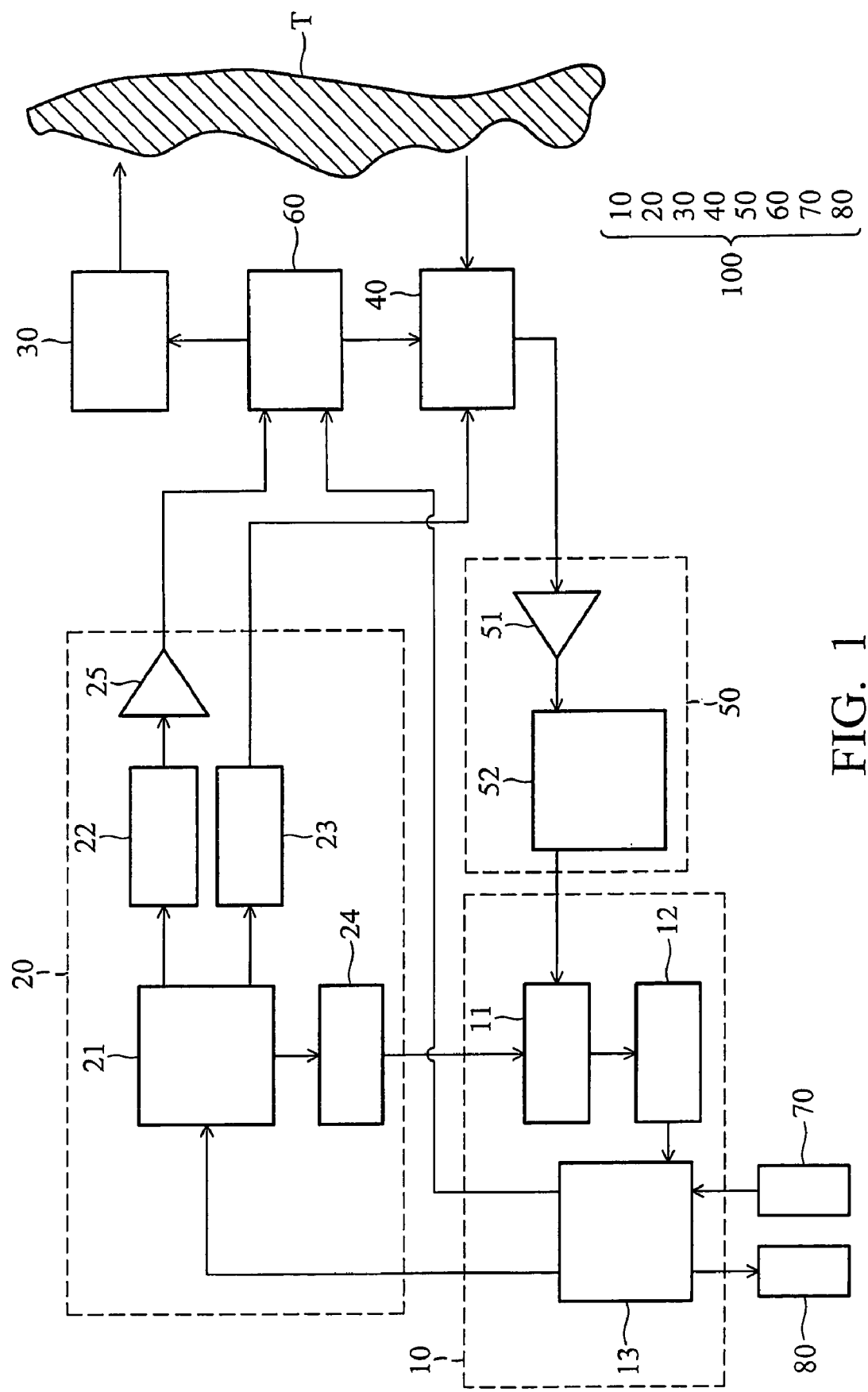
FIG. 1 is a schematic view of an embodiment of a distant measurement system of the invention.

FIG. 1 is a schematic view of an embodiment of a distant measurement system 100. The distant measurement system 100 at least comprises a controlling module 10, a signal generating module 20, an emitting module 30, a receiving module 40, a processing module 50, a switching unit 60, an inputting module 70 and an outputting module 80.

The controlling module 10, in accordance with a measuring index coming from the inputting module 70, commands a driving index to the signal generating module 20, thus, commanding the signal generating module 20 to provide a first frequency signal, a second frequency signal and a comparative frequency signal to the emitting module 30, the receiving module 40 and the controlling module 10, respectively.

Specifically, the signal generating module 20 comprises a frequency generator (e.g. frequency source divider, PLL 21), a first modular 22, a second modular 23, a first filtering module 24 and a driver 25. The frequency generator 21 at least outputs the first frequency signal, the second frequency signal and a comparative frequency signal. The first frequency signal output from the frequency generator 21 is modulated by the first modular 22 for converting square waves to sinusoidal waves and processed by the driver 25 for providing a driving signal to the emitting module 30. Note that the driving signal provided by the driver 25 is provided with a modulated frequency f1. The second frequency signal output from the frequency generator 21 is modulated by the second modular 23 for performing square wave-sinusoidal wave conversion to obtain a local oscillating signal and transmit the local oscillating signal to the receiving module 40. Note that the local oscillating signal is provided with a local oscillating frequency f2. The comparative frequency signal output from the frequency generator 21 is filtered by the first filtering module 24 for generating a comparative signal with comparative frequency (f1-f2), and transmits the comparative signal to the controlling module 10. In practice, the first modular 22 and the second modular 23 are replaced by a LC filter, i.e., particular to an LC resonator bandpass filter, and the first filtering module 24 is capable of filtering by a narrow band.

The emitting module 30 sequentially emits a first light beam and a second light beam according to the driving signal provided by the driver 25. At least one laser diode (LD), for example, is utilized by the emitting module 30 to serve as a light emitting component. The light emitting component is actuated by the driving signal provided by the driver 25 and emits the first and second light beams according to the first frequency signal. The first light beam serves as a measurement signal, and the second light beam serves as a reference signal.

The receiving module 40 receives the reference signal and the measurement signal reflected from the target at different time. The received reference signal and the measurement signal and the second frequency signal are mixed by the receiving module 40, thus, correspondingly outputting a first electrical signal and a second electrical signal.

With respect to the receiving module 40, an avalanche photodiode (APD) can be used as an optical receiving element 43. An anode of the APD coupled to the second modular 23 is utilized to receive the second frequency signal provided by the signal generating module 20 and, simultaneously, to sequentially receive the reference signal output from the emitting module 30 and the measurement signal reflected from the target T. Therefore, the second frequency signal is respectively mixed with the measurement signal and the reference signal by the APD, and the APD is capable of generating the first electrical signal corresponding to the measurement signal and the second electrical signal corresponding to the reference signal by optical-electronic conversion characteristic thereof.

The processing module 50 at least comprises an amplifier 51 and a second filtering module 52. The first and second electrical signals output from the receiving module 40 are sequentially received and individually processed by the processing module 50. The amplifier 51 is utilized to individually amplify the mixed first and second electrical signals. The second filtering module 52 is utilized to individually filter the first and second electrical signals output from the amplifier 51 and to correspondingly output a first predetermined signal and a second predetermined signal, which are with specific or fixed frequency. The second filtering module 52 is capable of filtering by the narrow band. The first and second predetermined signals are middle-frequency signals with comparative frequency (f1-f2).

The controlling module 10 at least comprises an A/D convertor 11, a discriminator 12 and an operating center 13. The A/D convertor 11 receives the comparative signal generated by the signal generating module 20 and the first and second predetermined signals output from the processing module 50, and individually performs A/D conversion on the first and second predetermined signals to correspondingly generate a first digital signal and a second digital signal. The discriminator 12 receives the first and second digital signals and outputs a phase differential formed therebetween. Finally, the operating center 13 calculates the distance between the distant measurement system 100 and the target T by the phase differential, and the outputting module 80 receiving at least one displaying index transmitted from the processing module 50 and displays messages corresponding to the displaying index or the value of the measured distance.

The switching unit 60 is used as a switch mechanism, which is utilized, in accordance with a switching index of the controlling module 10, to control the receiving module 40 to receive the measurement signal and the reference signal reflected from the target T in accordance with the switching sequence.

In other words, the controlling module 10 not only commands the driving index to the signal generating module 20, but also commands the switching index to the switching unit 60. The switching unit 60, electrically connected between the controlling module 10 and the emitting module 30, in accordance with the switching sequence, sequentially controls the emitting module 30 to emit the measurement signal and the reference signal by the first frequency signal, thereby controlling the sequence of the receiving module 40 to receive the measurement signal and the reference signal reflected from the target T. Alternatively, the switching unit 60 is mechanically connected between the controlling module 10 and the receiving module 40, thereby controlling the sequence of the receiving module 40 to receive the measurement signal and the reference signal reflected from the target T.

Figure 2:
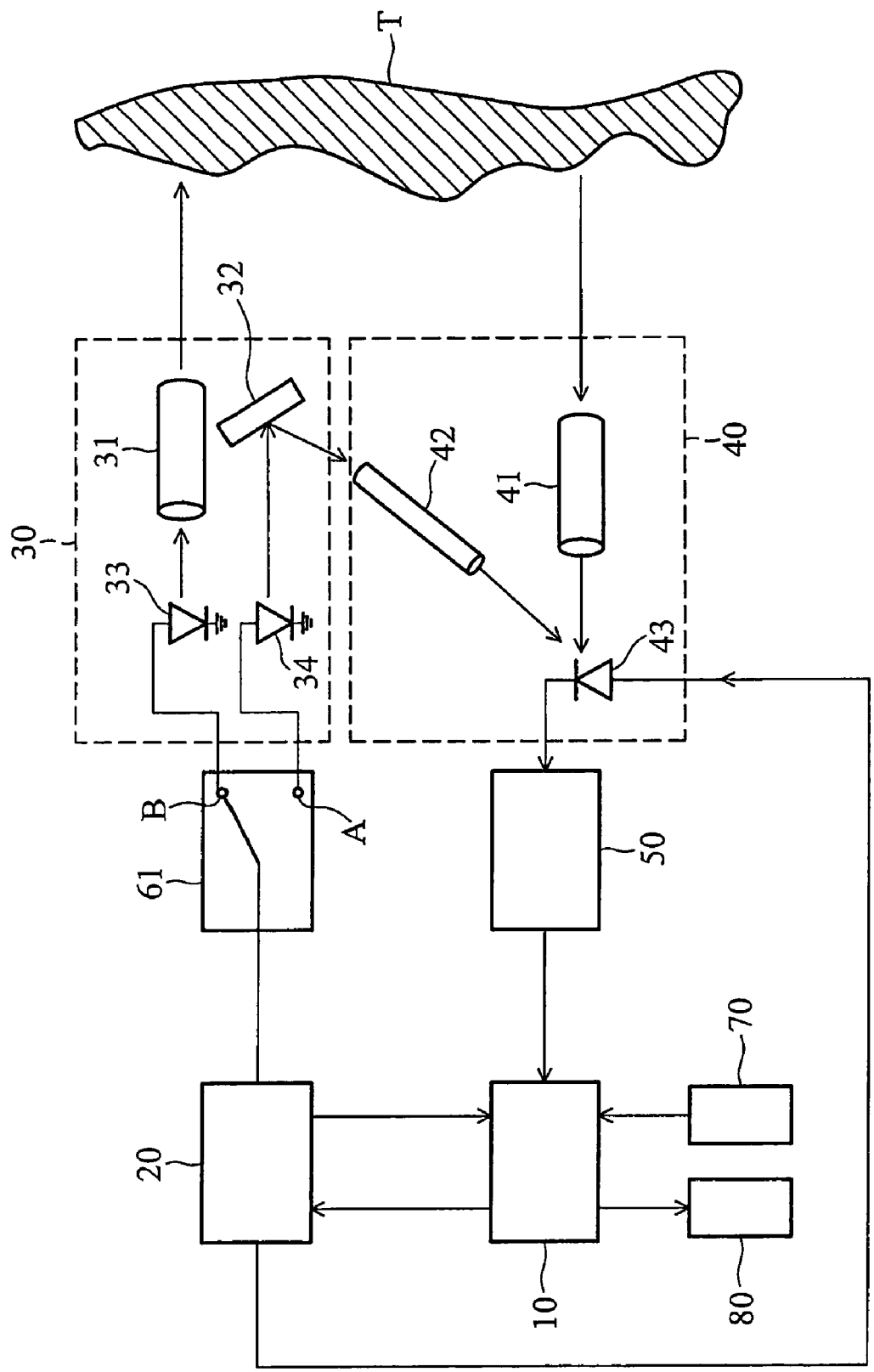
FIG. 2 is a schematic view of an embodiment of a distant measurement system, wherein a switching unit controls an emitting module to emit a measurement signal and a reference signal in accordance with a switching sequence.

Referring to FIGS. 1 and 2 simultaneously, FIG. 2 shows an embodiment of a distant measurement system, wherein the switching unit 60 controls the emitting module 30 to emit the measurement signal and the reference signal in accordance with a switching sequence.

The emitting module 30 comprises a first collimating lens 31, a total reflecting element 32, a first light emitting element 33 and a second light emitting element 34.

The switching unit 60 comprises an electrical switch 61 serving as a switch mechanism, in accordance with a first switching index emitted by the controlling module 10, to electrically control the first and second emitting elements 33 and 34 of the emitting module 30 to sequentially emit the measurement signal and the reference signal.

Specifically, the electrical switch 61 is a relay coupled between the signal generating module 20 and the emitting module 30 to turn on a first contact "A" or a second contact "B" according to the first switching index. That is, when the first contact "A" actuated by the electrical switch 61 is open, the electrical switch 61 is contacted with the second contact "B" to drive the first light emitting element 33 to emit the measurement signal by the driving signal of the signal generating module 20, and the second light emitting element 34 is shut down due to the opened first contact "A". When the second contact "B" actuated by the electrical switch 61 is open, the electrical switch 61 is contacted with the first contact "A" to drive the second light emitting element 34 to emit the reference signal to the receiving module 40 by the driving signal of the signal generating module 20, and the first light emitting element 33 is shut down due to the opened second contact "B".

The measurement signal penetrating the first collimating lens 31 travels toward the target T. The reference signal reflected from the total reflecting element 32 is directly transmitted to the receiving module 40.

The receiving module 40 comprises a second collimating lens 41, a light conduit 42 and a light receiving element 43. When the reference signal is transmitted into the receiving module 40, the reference signal is guided to the light receiving element 43 via the light conduit 42. When the measurement signal is reflected from the target T, the measurement signal is guided to the light receiving element 43 via the second collimating lens 41.

Thus, the controlling module 10 is capable of controlling the emitting module 30 to emit the measurement signal and the reference signal at different times by the first switching index, to cause the receiving module 40 to, sequentially and individually, receive the measurement signal and the reference signal in accordance with the switching sequence.

Figure 3:
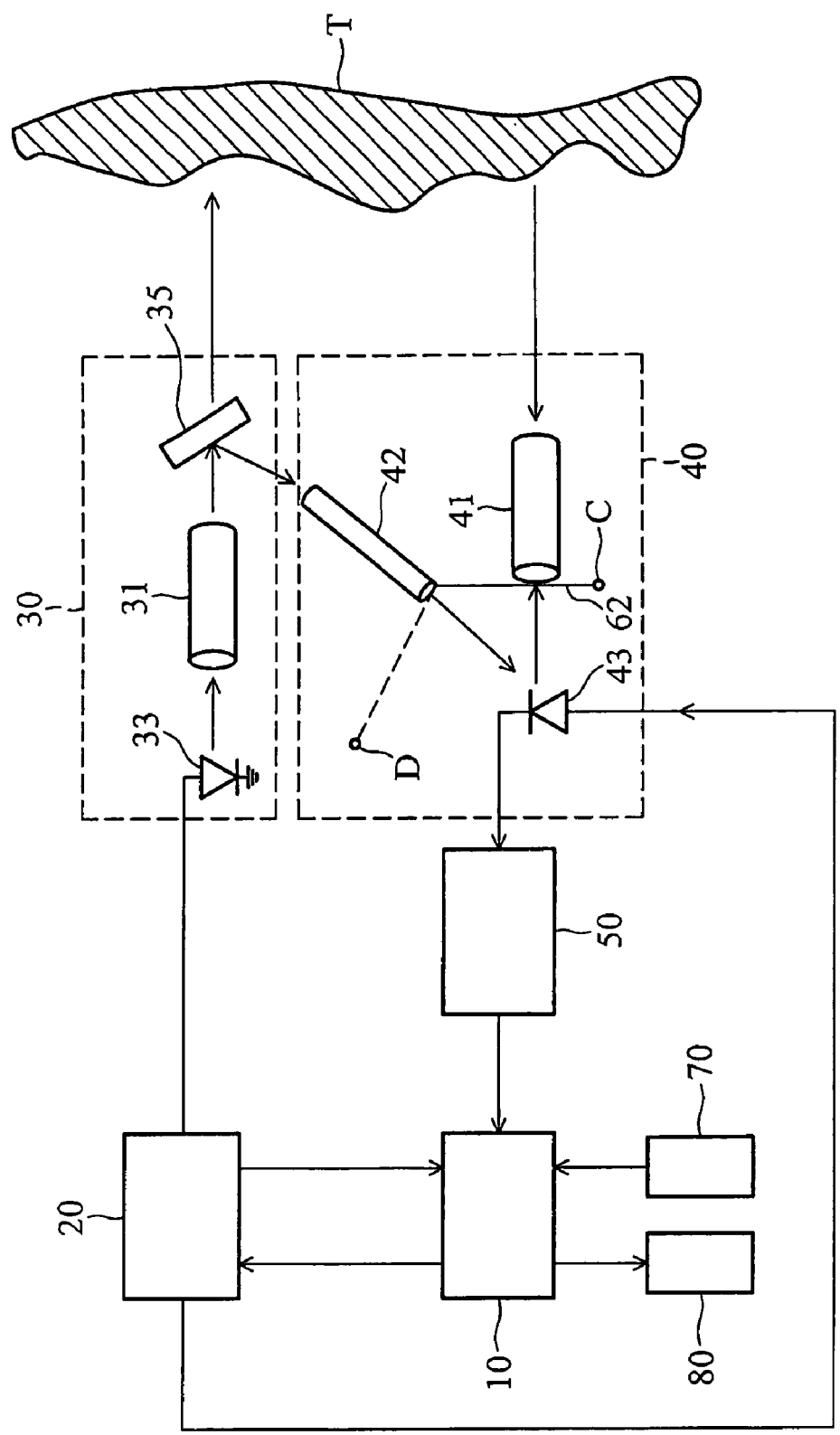
FIG. 3 is a schematic view of an embodiment of a distant measurement system, wherein a switching unit controls a receiving module, in accordance with a switching sequence, to individually receive a measurement signal and a reference signal reflected from a target (T)

Referring to FIGS. 1 and 3 simultaneously, FIG. 3 shows an embodiment of a distant measurement system, wherein the switching unit 60 controls the receiving module 40, in accordance with the switching sequence, to individually receive the measurement signal and the reference signal reflected from the target T.

The emitting module 30 at least comprises the first collimating lens 31, the first light emitting element 33 and a light dividing element 35. The first light emitting element 33 emits a light beam signal based on the driving signal provided by the signal generating module 20. The light beam signal penetrating the first collimating lens 31 is transmitted to the light dividing element 35, thereby dividing the light beam signal into the measurement signal and the reference signal by the light-dividing characteristic of the light dividing element 35. The measurement signal penetrating the light dividing element 35 travels toward the target T, and the reference signal reflected from the light dividing element 35 is directly transmitted to the receiving module 40.

The receiving module 40 comprises the second collimating lens 41, the light conduit 42 and the light receiving element 43. When the reference signal is transmitted into the receiving module 40, the reference signal is guided to the light receiving element 43 via the light conduit 42. When the measurement signal is reflected from the target T, the measurement signal is guided to the light receiving element 43 via the second collimating lens 41.

The switching unit 60 comprises a mechanical switch 62 serving as a switch mechanism, in accordance with a first switching index emitted by the controlling module 10, to mechanically control the light receiving element 43 to receive the measurement signal and the reference signal in accordance with the switching sequence. The mechanical switch 62 comprises a hood element utilized to block a light path of the light beam.

Specifically, the mechanical switch 62 is a shutter disposed at a distal end of the light conduit 42 and switched between a first position "C" and a second position "D" in accordance with the second switching index. That is, when the mechanical switch 62 is set at the first position "C", the mechanical switch 62 blocks the light path of the measurement signal, thus, the light receiving element 43 is allowed to receive the reference signal and not allowed to receive the measurement signal. When the mechanical switch 62 is set at the second position "D", the mechanical switch 62 blocks the light path of the reference signal, thus, the light receiving element 43 is allowed to receive the measurement signal and not allowed to receive the reference signal.

Thus, the controlling module 10 is capable of precisely controlling the receiving module 40 by the second switching index to individually receive the measurement signal and the reference signal in accordance with the switching sequence.

Figure 4:
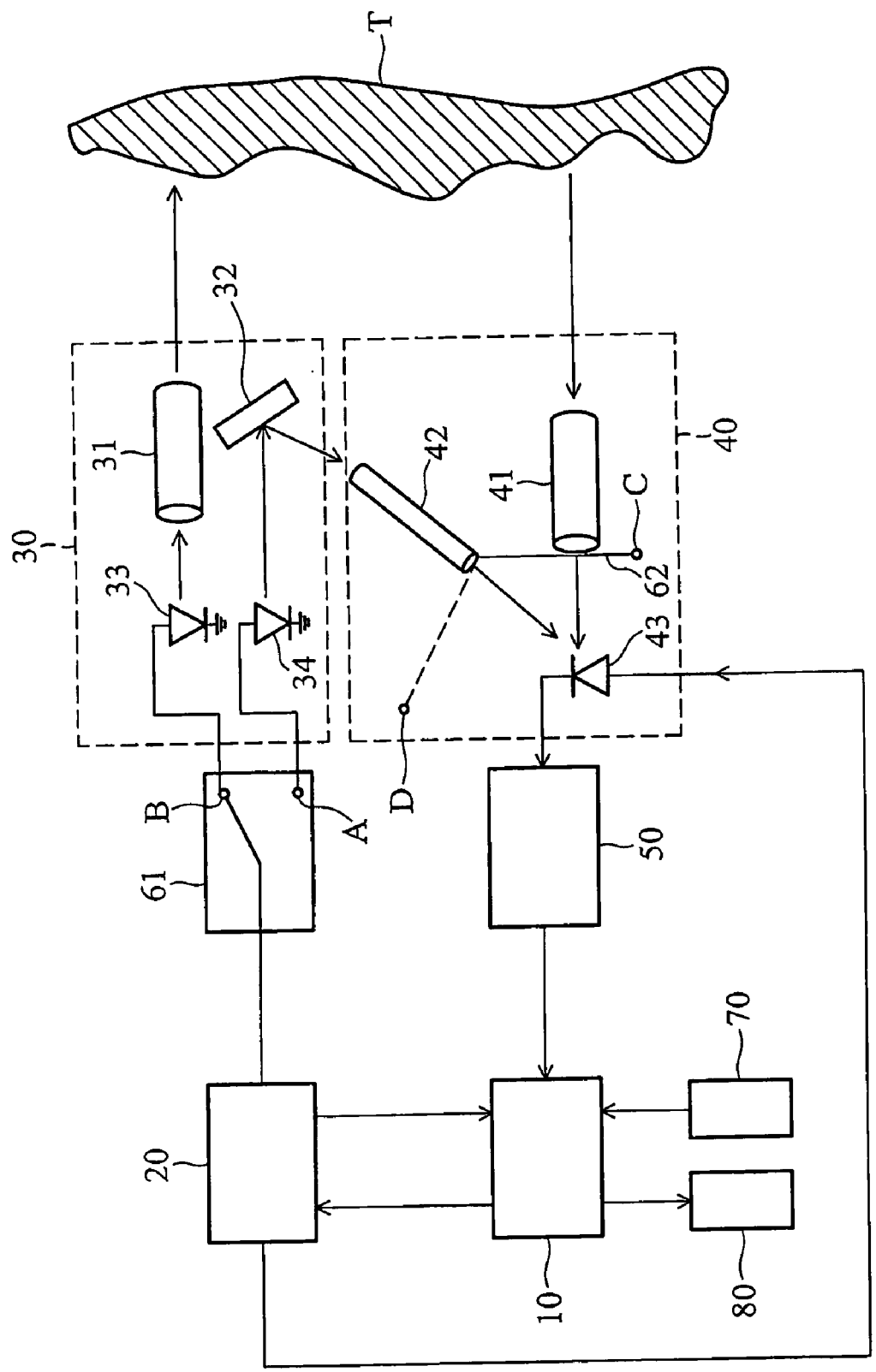
FIG. 4 is a schematic view of another embodiment of a distant measurement system, wherein a switching unit controls a receiving module, in accordance with a switching sequence, to individually receive a measurement signal and a reference signal reflected from a target (T).

Referring to FIGS. 1 and 4 simultaneously, FIG. 4 is a schematic view of another embodiment of a distant measurement system, wherein the switching unit controls the receiving module, in accordance with the switching sequence, to individually receive the measurement signal and the reference signal reflected from the target T.

The emitting module 30 comprises the first collimating lens 31, the total reflecting element 32, the first light emitting element 33 and the second light emitting element 34. The receiving module 40 comprises the second collimating lens 41, the light conduit 42 and the light receiving element 43. The switching unit 60 comprises the electrical switch 61 and the mechanical switch 62, which serve as the switch mechanisms.

The electrical switch 61 electrically coupled between the signal generating module 20 and the emitting module 30, in accordance with the first switching index, drives the first light emitting element 33 and the second light emitting element 34 of the emitting module 30 to individually and sequentially emit the measurement signal and the reference signal. The mechanical switch 62 disposed at the distal end of the light conduit 42, in accordance with the second switching index, controls the light receiving element 43 to receive the measurement signal and the reference signal in accordance with the switching sequence. In this embodiment, the electrical switch 61 is a relay, and the mechanical switch 62 is a shutter.

Specifically, the electrical switch 61 turns on a first contact "A" or a second contact "B" according to the first switching index. That is, when the first contact "A" actuated by the electrical switch 61 is open, the electrical switch 61 is contacted with the second contact "B" to drive the first light emitting element 33 to emit the measurement signal by the driving signal of the signal generating module 20, and the second light emitting element 34 is shut down due to the opened first contact "A". When the second contact "B" actuated by the electrical switch 61 is open, the electrical switch 61 is contacted with the first contact "A" to drive the second light emitting element 34 to emit the reference signal to the receiving module 40 by the driving signal of the signal generating module 20, and the first light emitting element 33 is shut down due to the opened second contact "B".

The reference signal reflected from the total reflecting element 32 is directly transmitted to the receiving module 40 and guided to the light receiving element 43 via the light conduit 42. The measurement signal penetrating the first collimating lens 31 travels toward and is reflected by the target T, and the reflected measurement signal is guided to the light receiving element 43 by the second collimating lens 41.

Specifically, the mechanical switch 62 is switched between the first position "C" and the second position "D" in accordance with the second switching index. That is, when the mechanical switch 62 is set at the first position "C", the mechanical switch 62 blocks the light path of the measurement signal, thus, the light receiving element 43 is allowed to receive the reference signal and not allowed to receive the measurement signal. When the mechanical switch 62 is set at the second position "D", the mechanical switch 62 blocks the light path of the reference signal, thus, the light receiving element 43 is allowed to receive the measurement signal and not allowed to receive the reference signal.

Thus, the controlling module 10 is capable of precisely controlling the receiving module 40 by the first and second switching indexes to individually receive the measurement signal and the reference signal in accordance with the switching sequence.

Further, a distant measurement method applied for the distant measurement system 100 is provided. The emitting module 30, serving as an emitting terminal for the distant measurement system 100, commands the signal generating module 30 of a signal generation terminal to sequentially emit the first and second light beams in accordance with the measurement index commanded by the controlling module 10 of a controlling terminal. The receiving module 40, serving as a receiving terminal, sequentially receives the first light beam reflected from the target to correspondingly provide the first electrical signal and receives the second light beam to correspondingly provide the second electrical signal. Finally, a controlling terminal is utilized to receive the first and second electrical signals and distance between the distant measurement system 100 and the target T is calculated in accordance with a phase differential formed between the first and second electrical signals. The switching unit 60 is used as the switch mechanism to control the receiving terminal to receive the first and second light beams in accordance with the switching sequence.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A distant measurement method applied for a distant measurement system, comprising the following steps:
   (a) emitting a first light beam and a second light beam from an emitting terminal, wherein the first light beam travels toward a target;
   (b) providing a switching sequence by a switch mechanism;
   (c) placing a receiving terminal to receive the first light beam reflected from the target and the second light beam in accordance with the switching sequence, and correspondingly to provide a first electrical signal and a second electrical signal; and
   (d) utilizing a controlling terminal to receive the first and second electrical signals, and calculating distance between the distant measurement system and the target in accordance with a phase differential formed between the first and second electrical signals; and
   wherein the step (a) further comprises providing a first frequency signal and a second frequency signal by an emitting terminal in accordance with a driving index transmitted from the controlling terminal; and
   wherein the receiving terminal receives the second frequency signal, and the second frequency signal is mixed with the first and second electrical signals, respectively.

2. The distant measurement method as claimed in claim 1, wherein the switch mechanism, in accordance with a first switching index transmitted from the controlling terminal, electrically controls a first emitting element and a second emitting element of the emitting terminal to emit the first and second light beams in accordance with the switching sequence.

3. The distant measurement method as claimed in claim 1, wherein the switch mechanism, in accordance with a second switching index transmitted from the controlling terminal, mechanically receives the first and second light beams in accordance with the switching sequence.

4. The distant measurement method as claimed in claim 3, wherein the switching sequence, in accordance with the second switching index, blocks between a first light path of the first light beam and a second light path of the second light beam.

5. The distant measurement method as claimed in claim 1, wherein between the steps (c) and (d) comprise the following steps:
   (e) individually amplifying the mixed first and second electrical signals; and
   (f) individually filtering the amplified first and second electrical signals and correspondingly generating a first predetermined fixed frequency signal and a second predetermined fixed frequency signal.

6. The distant measurement method as claimed in claim 1, wherein the step (d) further comprises of:
   (d1) individually performing A/D conversion on the first and second electrical signals, to correspondingly generate a first digital signal and a second digital signal; and
   (d2) comparing the first digital signal to the second digital signal, to obtain the differential between the first and second digital signals.

7. A distant measurement system, comprising:
   an emitting module, emitting a first light beam and a second light beam, respectively, wherein the first light beam travels toward a target;
   a receiving module, receiving the first light beam reflected from the target to convert the reflected first light beam to a first electrical signal and receiving the second light beam to convert the reflected second light beam to a second electrical signal;
   a switching unit, controlling the receiving module to receive the first and second light beams in accordance with the switching sequence; and
   a controlling module, receiving the first and second electrical signals outputted from the receiving module and calculating distance between the distant measurement system and the target in accordance with a phase differential formed between the first and second electrical signals; and
   a signal generating module providing a first frequency signal and a second frequency signal by a signal generation terminal in accordance with a driving index transmitted from the controlling terminal; and
   wherein the receiving module receives the second frequency signal, and the second frequency signal is mixed with the first and second electrical signals, respectively.

8. The distant measurement system as claimed in claim 7, further comprising a processing module, comprising:
   an amplifier, individually amplifying the mixed first and second electrical signals; and
   a filter, individually filtering the first and second electrical signals outputted from the amplifier and correspondingly generating a first predetermined fixed frequency signal and a second predetermined fixed frequency signal.

9. The distant measurement system as claimed in claim 7, wherein the receiving module comprises a light receiving element, and the second frequency signal is mixed with the first and second electrical signals by the light receiving element, respectively.

10. The distant measurement system as claimed in claim 9, wherein the switching unit comprises an electrical switch and the emitting module comprises a first emitting element and a second emitting element, and the electrical switch, in accordance with a first switching index of the controlling module, controls the first and second emitting elements of the emitting module to emit the first and second light beams in accordance with the switching sequence.

11. The distant measurement system as claimed in claim 9, wherein the switching unit comprises a mechanical switch, and in accordance with a second switching index of the controlling module, controls the light receiving element to receive the first and second light beams in accordance with the switching sequence.

12. The distant measurement system as claimed in claim 11, wherein the mechanical switch, in accordance with the second switching index, blocks the light receiving element to receive the first light beam or the second light beam.

13. The distant measurement system as claimed in claim 12, wherein the mechanical switch comprises a hood element blocking a first light path of the first light beam or a second light path of the second light beam.

14. The distant measurement system as claimed in claim 7, wherein the controlling module individually performs A/D conversion on the first and second electrical signals to correspondingly generate a first digital signal and a second digital signal, and compares the first digital signal to the second digital signal, to obtain the differential between the first and second digital signals.

15. The distant measurement system as claimed in claim 7, further comprising:
    an optical element reflecting the second light beam; and
    a light conduit transmitting the second light beam reflected from the optical element to the receiving module.

16. The distant measurement system as claimed in claim 7, further comprising:
    an inputting module receiving and transmitting an external index to the controlling module; and
    an outputting module receiving at least one displaying index transmitted from the processing module and displaying a message corresponding to the displaying index.

* * * * *